United States Patent
Tatham et al.

(10) Patent No.: US 9,105,018 B2
(45) Date of Patent: Aug. 11, 2015

(54) BILL-PAY INTEGRATION

(71) Applicant: Bank of America Corporation, Charlotte, NC (US)

(72) Inventors: Anne D. Tatham, Charlotte, NC (US); Milton Santiago, Jr., Chicago, IL (US); Christopher Hope, Toonbridge Kent (GB); Richard M. Brewer, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 13/917,774

(22) Filed: Jun. 14, 2013

(65) Prior Publication Data

US 2014/0372294 A1    Dec. 18, 2014

(51) Int. Cl.
*G06Q 20/10* (2012.01)

(52) U.S. Cl.
CPC ................... *G06Q 20/102* (2013.01)

(58) Field of Classification Search
None
See application file for complete search history.

(56) References Cited

U.S. PATENT DOCUMENTS 7,636,688 B2 * 12/2009 Kitchen et al. ............... 705/39
2011/0270755 A1 * 11/2011 Pinski ............................ 705/44

* cited by examiner

*Primary Examiner* — Kimberly Berona
*Assistant Examiner* — Joseph W King
(74) *Attorney, Agent, or Firm* — Weiss & Arons LLP; Michael A. Springs, Esq.

(57) ABSTRACT

Apparatus and methods for bill integration are provided. Checks issued by a bill-pay vendor may be integrated into a daily issue file and be presented to a user for review. The review may include selecting one or more check service to be applied to a check. The presenting may including marking checks and images corresponding to items received from a bill-pay vendor. Credit card transactions initiated via a bill-pay vendor may be integrated into the daily issue file. Checks received from the bill-pay vendor may be numbered into a range that is not a user-generated range. Bill-pay integration may include just-in-time funding of payments initiated through the bill-pay vendor. The daily issue file may be accessed via a mobile device, and may be filtered based on an entitlement associated with the mobile device.

6 Claims, 11 Drawing Sheets

FIG. 10A

AFFIRMATION FILE

| ACTION | ID | DATE | PAYEE | AMOUNT | CURRENCY | ACCOUNT NO. |
|---|---|---|---|---|---|---|
| AFFIRM ☑ REJECT ☐ | BP333 | 04/21/13 | XYZ CORP. | 120,000.00 | USD | XXXXX6780 |
| AFFIRM ☐ REJECT ☑ | BP332 | 04/21/13 | ABC,SA | 345,678.00 | EUR | XXXXX55567 |
| AFFIRM ☑ REJECT ☐ | 156 | 04/21/13 | QWE,LLC | 15,000.00 | USD | XXXXX6780 |
| AFFIRM ☐ REJECT ☑ | 155 | 04/20/13 | ASD,INC. | 23,000.00 | CAD | XXXXX56696 |

FIG. 10B

RECONCILIATION FILE

| IMAGE | STATUS | ID | DATE | PAYEE | AMOUNT | CURRENCY | ACCOUNT NO. |
|---|---|---|---|---|---|---|---|
| ○ | AFFRM | BP333 | 04/21/13 | XYZ CORP. | 120,000.00 | USD | XXXXX6780 |
| ☐ | REJ | BP332 | 04/21/13 | ABC,SA | 345,678.00 | EUR | XXXXX55567 |
| ○ | AFFRM | 156 | 04/21/13 | QWE,LLC | 15,000.00 | USD | XXXXX6780 |
| ☐ | REJ | 155 | 04/20/13 | ASD,INC. | 23,000.00 | CAD | XXXXX56696 |
| ○ | -- | 175 | 04/20/13 | DEF,PC | 10,000.00 | USD | XXXXX4567 |

FIG. 11A

| | ID | DATE | PAYEE | AMOUNT | CURRENCY | ACCOUNT NO. |
|---|---|---|---|---|---|---|
| | BP333 | 04/21/13 | XYZ CORP. | 120,000.00 | USD | XXXXX6780 |
| | BP332 | 04/21/13 | ABC,SA | 345,678.00 | EUR | XXXXX55567 |
| | 156 | 04/21/13 | QWE,LLC | 15,000.00 | USD | XXXXX6780 |
| | 155 | 04/20/13 | ASD,INC. | 23,000.00 | CAD | XXXXX56696 |

Labels: 1109 (ID), 1111 (DATE), 1113 (PAYEE), 1115 (AMOUNT), 1117 (CURRENCY), 1119 (ACCOUNT NO.), 1121, 1123, 1125, 1127, 1102, 1105

FIG. 11B

| ID | DATE | PAYEE | AMOUNT | CURRENCY | ACCOUNT NO. |
|---|---|---|---|---|---|
| BP333 | 04/21/13 | XYZ CORP. | 120,000.00 | USD | XXXXX6780 |
| BP332 | 04/21/13 | ABC,SA | 345,678.00 | EUR | XXXXX55567 |

Labels: 1103, 1104, 1105

BILL-PAY INTEGRATION

FIELD OF TECHNOLOGY

Aspects of the invention relate to treasury management of expenditures. More specifically, aspects of the invention relate to expenditures paid by check.

BACKGROUND

Although transactions are increasingly executed online and using transaction cards, negotiable instruments continue to be used for executing transactions. A negotiable instrument, such as a check, includes an instruction of a customer of a financial institution. The instruction may include an order instructing the financial institution to pay an amount to a payee.

A financial institution that is subject to an order to pay the amount may be a drawee bank. The customer that orders the drawee bank to pay the amount may be a drawer or a payer.

The payee may receive the check as payment for services or goods provided to the payer. The payee may receive the check directly from the payer.

The check may be issued by a bill-pay vendor. The bill-pay vendor may provide check issuing services to the payer. The bill-pay vendor may receive instructions from the payer. The instructions may direct the bill-pay vendor to generate one or more paper checks. The bill-pay vendor may transmit the paper check to the payee.

The payee may present the check received from the bill-pay vendor for deposit at a depositary financial institution (hereinafter, "depositary bank"). The payee may request that the amount noted on the check be credited to an account of the payee. The depositary bank may provide financial services to the payee. A service provided by the depositary bank may include processing of a check issued by the payer.

Processing of a check may include receiving a check from the payee. Processing may include receiving a request from the payee to credit an account of the payee. The credit may correspond to a handwritten amount indicated in a segment of the check.

The depositary bank may receive the check and transmit a copy of the check to the drawee bank. The depositary bank may request that the drawee bank transfer funds to the depositary bank. The funds may correspond to the amount indicated on the check. The funds may be credited to an account of the payee held at the depositary bank.

The drawee bank may provide services to the payer. The services may include check services. The check services may include fraud detection services. The popularity of checks has been accompanied by check fraud. Check fraud may include a printing of a check that is not authorized by the payer or the bill-pay vendor. Check fraud may include presenting an unauthorized check for deposit.

Upon receiving the copy of the check, the drawee bank may attempt to assess an authenticity of the check. To assess authenticity, the drawee bank may attempt to detect a fraudulent check. A fraudulent check may be detected by examining one or more segments of a check template. For example, upon inspection, a signature segment of a check template may include a signature that does not correlate to a known signature of the payer. A visual inspection of the check may indicate that a numerical segment stating the amount may not correlate to a segment describing the amount in words.

Check services provided by a depositary or drawee bank may include presenting a deposited check to the payer or payee for confirmation. Check services may include stopping payment on a check or temporarily suspending processing of the check. Check services may include, prior to debiting an account of the payer, reconciling a deposited check with a ledger of checks maintained by the drawee bank on behalf of the payer. Check services may include filtering deposited checks for suspicious or out of pattern checks.

Various check services provided by the drawee bank may streamline a processing of checks and reduce incidents of check fraud. However, a drawee bank may not have access to all checks issued in the name of the payer. For example, check issued on behalf of the payer by a bill-pay vendor may not be available to the drawee bank. The drawee bank may be unable to provide a variety of check services to the payer.

It would be desirable to provide a treasury management system that provides check services independent of an issuing source of a check. It would be desirable, therefore, to integrate apparatus and methods for bill-pay services into a treasury management system.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIGS. 10A and 10B show illustrative information in accordance with principles of the invention; and FIGS. 11A, 11B and 11C show illustrative information in accordance with principles of the invention.

DETAILED DESCRIPTION OF THE INVENTION

Figure 1:
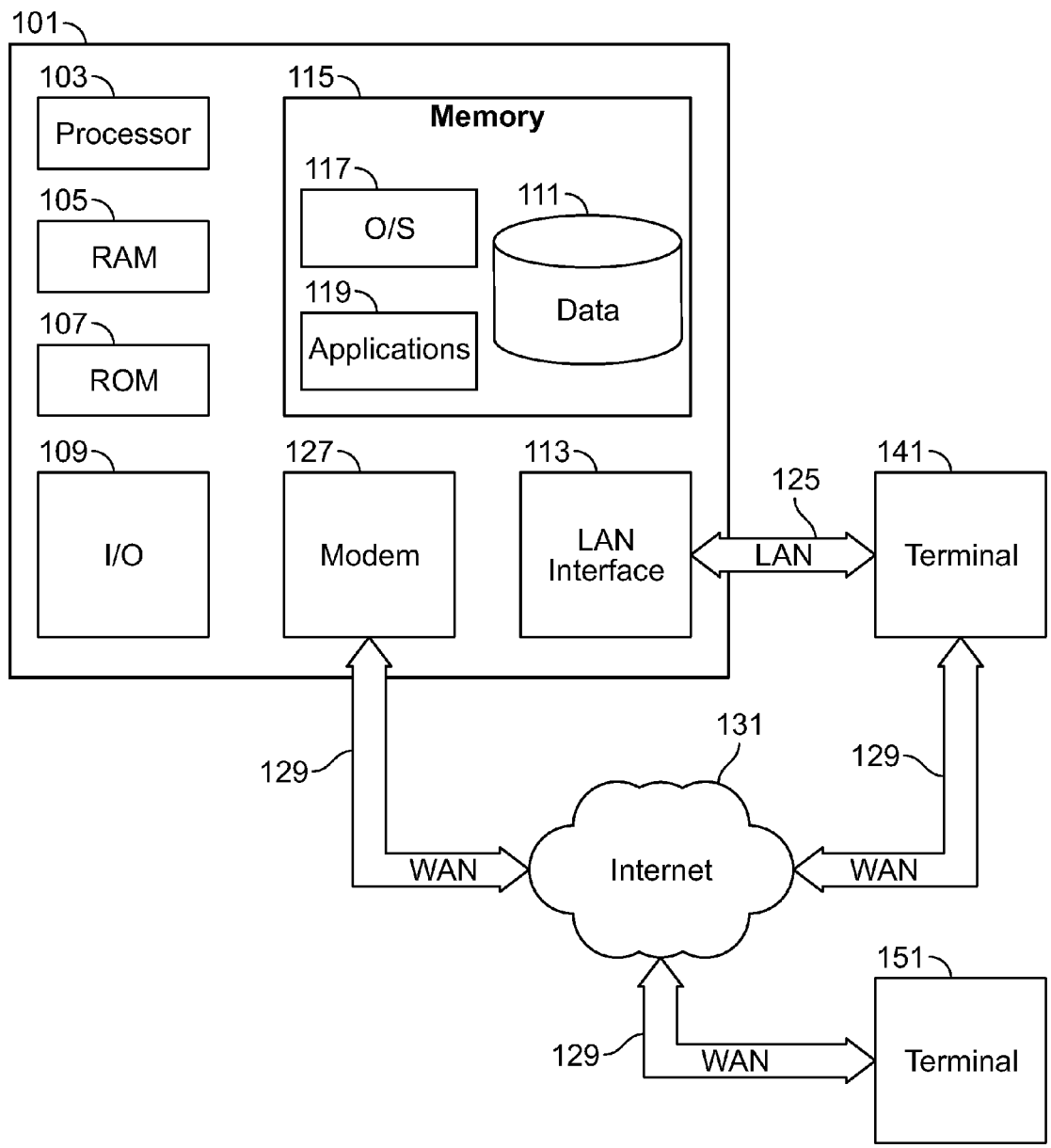
FIG. 1 shows an illustrative apparatus in accordance with principles of the invention.

Apparatus and method for bill-pay integration are provided.

The apparatus may include a treasury management system. The treasury management system may include a check issuing apparatus. The check issuing apparatus may be controlled by a bill-pay vendor. The bill-pay vendor may be distinct from a drawee bank.

The check issuing apparatus may include a first non-transitory computer readable medium having first computer readable program code embodied therein. The check issuing apparatus may include a first processor configured to execute the first computer readable program code. The first computer readable program code in the check issuing apparatus, when executed by the processor, may configure the check issuing apparatus to receive a payment instruction from a payer. In response to the payment instruction, the check issuing apparatus may issue a check to a payee. The check may include first payment information.

The treasury management system may include a central management apparatus ("CMA"). The CMA may be controlled by a drawee bank. The CMA may include a second non-transitory computer readable medium having second computer readable program code embodied therein. A second processor may be configured to execute the second computer readable program code. The second computer readable program code in the CMA, when executed by the processor, may configure the CMA to receive the first payment information from the bill-pay vendor.

The CMA may receive second payment information from the payer. A check issued by the payer may include the second payment information. A payer may issue some checks directly and some checks via a bill-pay vendor.

The CMA may generate an issue file. The issue file may include the first payment information received from the bill-pay vendor. The issue file may include the second payment information received from the payer.

The CMA may display the issue file to the payer. The issue file may include a plurality of entries. The first payment information may be a first entry in the issue file. The second payment information may be a second entry in the issue file. The CMA may filter the issue file before transmitting the issue file to the payer. The CMA may filter the issue file before displaying the issue file to the payer. The filtering may be based on payer defined criteria or system set criteria.

For example, the payer may only wish to review a payment made to a specific payee or a payment amount in a specific currency. The filtered issue file displayed to the payer may only include payments made to the specific payee or payment amounts in the specific currency.

The CMA may prompt the payer to confirm or reject the displayed payment information. The displayed payment information may include the payment information received from the bill-pay vendor and the payment information received from the payee. The issue file may integrate the first payment information received from the bill-pay vendor and the second payment information received from the payee. A rejection of the displayed payment information may correspond to placing a stop on a check corresponding to the payment information.

The first payment information may include a first identifier, a first amount and an account of the payer at the drawee bank. The second payment information may include a second identifier, a second amount and the account of the payer at the drawee bank.

Generating the issue file may include assigning a third identifier to the first payment information. The first payment information may include a first identifier assigned by the bill-pay vendor. Upon receipt of the payment information from the bill-pay vendor, a new identifier may be assigned to the payment information. The new identifier may be the third identifier. The third identifier may be different from an identifier assigned by the bill-pay vendor.

The third identifier may be a member of a set of identifiers. The set of identifiers may not include the first identifier. The set of identifiers may not include the second identifier assigned to the second payment information. The third identifier may distinguish a source of the first payment information (bill-pay vendor) from a source of the second payment information (payer). Based on the third identifier, the payer viewing the first payment information may visual identify a source of the first payment information. The third identifier may be a sequence of numbers, a logo, a color coding or any suitable identifier.

The CMA may receive payment information from a plurality of sources. Each source may be assigned a set of identifiers used to mark payment information received from the source. Each set of identifiers may be unique. The identifier assigned to payment information may identify the payment information as being associated with a particular source. When viewing the issue file, the payer may distinguish between payment information received from different sources based on the identifier assigned to each entry in the issue file.

In response to a confirmation of payment information included in the issue file, the CMA may approve a request received from a payee. The request may ask the drawee bank to debit an account of the payer held at the drawee bank. The account of the payer may be debited in response to a confirmation of the first payment information. The account of the payer may be debited in response to a confirmation of the second payment information.

The request may be received from a depositary bank. The request may be received from a payee. The request may correspond to a deposit of a check by the payee. The payee may receive the check from the bill-pay vendor. The payee may receive the check directly from the payer.

The request may correspond to a check deposited by a payee. If the request of the payee corresponds to an entry in the issue file, the drawee bank may debit the account of the payer held at the drawee bank. A request of the payee that corresponds to an entry in the issue file may signify that the payer has authorized a payment corresponding to details included in the request.

In some embodiments, a request may be paid by the drawee bank. In some embodiments, a request may not be paid by the drawee bank. In some embodiments, a request may be paid by the drawee bank without prior confirmation by the payer.

If a request of the payee does not correspond to an entry in the issue file, the system may associate the request with an exception flag. The exception flag may represent an unauthorized or fraudulent check. The exception flag may correspond to a payment that has not been reviewed by the payer. The exception flag may correspond to a payment that meets one or more threshold criteria defined by the payer and has not been reviewed by the payer. The exception flag may correspond to a payment that, if the payment had been included in the issue file, would have been presented to the payer after a filtering of the issue file. The exception flag may correspond to a reconciliation error.

The CMA may be configured to, in response to detection of the exception flag, present the flagged request to the payer. In response to a confirmation of the request by the payer, the system may terminate an ability of the payer to apply one or more check services, such as returning a check. Returning the check may include recovering funds withdrawn from an account of the payer. The confirmation may correspond to the payer overriding a reconciliation error associated with the exception. In response to overriding a reconciliation error, the CMA may be configured to add an entry to the issue file. The added entry may correspond to the exception.

A request may be one of a plurality of requests. The plurality of requests may be received from one or more payees. Each of the plurality of requests may be associated with an exception flag. Each of the plurality of requests may have triggered a reconciliation error. The CMA may be configured to present each of the plurality of requests to the payer.

For some exceptions, the CMA may receive a confirmation from the payer. For each confirmation received from the payer, the CMA may be configured to add an entry to the issue file.

For some exceptions, the CMA may receive a rejection from the payer. For each rejection received from the payer, the CMA may be configured to deny the request corresponding to the rejection. The CMA may be configured to temporarily deny the request and prompt the payer after an expiration time to reaffirm the rejection. The CMA may be configured to permanently reject the request in response to receiving the rejection. The CMA may be configured to permanently reject requests that meet one or more criteria defined by the payer. If the request has been paid by the drawee bank, the CMA may be configured to initiate a claw-back or return procedure to recover the amount paid by the drawee bank.

Apparatus may include one or more non-transitory computer-readable media storing computer-executable instructions which, when executed by a processor on a computer system, perform a method.

The method may include electronically notifying a payer of a bill-pay payment status. The bill-pay payment may be associated with generation of a paper check. The check may have been issued by a bill-pay vendor on behalf of the payer. The methods may include providing a payment status indication in response to further processing of the paper check.

The methods may include, at a first computer system operated by a first vendor, receiving a payment instruction from a payer. In response to receiving the payment instruction, the methods may include generating payment information. The payment information may include a payee, an amount and a number of an account held at a second vendor. The second vendor may be a financial institution. The second vendor may be a drawee bank. The payer may maintain one or more accounts at the second vendor.

The methods may include, at a computer system operated by the second vendor, receiving the payment information from the first vendor. The methods may include associating a unique identifier with the payment information received from the first vendor. The unique identifier may distinguish the payment information received from the first vendor from payment information generated by the second vendor or a third vendor.

The methods may include receiving a request from the payee for a transfer of the amount from the account of the payer. The request may correspond to a deposit of the paper check corresponding to the payment information. The request may be received from a depositary bank. The transfer may include transferring the amount to an account of the payee at the depositary bank. The depositary bank may be the drawee bank.

The methods may include displaying the payment information to the payer before granting the request of the payee. In response to the display of the payment information, the payer may affirm or reject the request.

The methods may include reconciling the request of the payee with the payment information received from the first vendor. The payment information received from the first vendor may be included in an entry of a ledger. The entry may include a digital image of the paper check. The ledger may include payment information received from a plurality of vendors. Each of the plurality of vendors may issue checks on behalf of the payer. Each of the plurality of vendors may generate payment information in response to receiving an instruction from the payer. Each of the plurality of vendors may transmit payment information generated on behalf of the payer to a central location. The central location may be a drawee bank of the payer.

If the request of the payee does not correspond to the payment information included in the ledger, the methods may include classifying the request as an exception. The methods may include displaying the exception to the payer. The display may include prompting the payer to apply a check service to the request. The check service may be any suitable check service. Illustrative check services are shown below in Table 1.

TABLE 1

| Illustrative check services. |
| --- |
| Illustrative Check Services |
| Hold payment |
| Stop/reject payment |
| Approve payment |
| Reconciliation |
| Contact payee for signature verification |
| Return of funds transferred to payee |

The methods may include configuring the second computer system to reject a payment of the amount associated with the exception. The methods may include approving a payment of the exception in response to a confirmation of the amount by the payer.

The methods may include displaying, adjacent to the exception, an indicator corresponding to the first vendor. The indicator may correspond to an identifier associated with the first vendor.

A payment instruction may be one of a plurality of payment instructions. The plurality of payment instructions may include a first payment instruction transmitted from the payer to the first vendor. The plurality of payment instructions may include a second payment instruction transmitted from the payer to the second vendor.

Each of the plurality of payment instructions may be issued by a payer. Each payment instruction may correspond to the issuance of a paper check on behalf of the payer. The methods may include receiving the plurality of payment instructions from the payer.

A payment request may be one of a plurality of payment requests. Each payment request may correspond to a deposit of a paper check by a payee. The paper check may have been issued to the payee on behalf of the payer. The methods may include receiving the plurality of payment requests from a plurality of payees. Each of the plurality of payees may have deposited a check that includes an account number of the payer.

The methods may include reconciling each of the plurality of requests with a ledger. The ledger may be an electronic ledger. The ledger may include a plurality of entries. Each entry of the ledger may correspond to a payment instruction issued by the payer. The methods may include approving each of the plurality of payment requests that are reconciled with at least one of the plurality of entries in the ledger.

The methods may include approving each of the plurality of payment requests that are reconciled with at least one of the plurality of payment instructions. The methods may include displaying, to the payer for confirmation, each of the plurality of payment requests not reconciled with at least one of the plurality of payment instructions. The methods may include displaying, to the payer for confirmation, each of the plurality of payment requests not reconciled with at least one of the plurality of entries in the ledger.

The first payment instruction may include a bill-pay authorization to transmit a credit card payment to the payee. The methods may include incorporating the authorized credit card payment into a ledger entry. A drawee bank may maintain the ledger and receive the payment instruction from the bill-pay vendor. The methods may include receiving a request from the payee to charge a credit card of the payer. The methods may include reconciling the request of the payee with the ledger.

If the ledger includes an entry corresponding to the charge request submitted by the payee, the charge may be approved. If the ledger does not include an entry corresponding to the charge request, the charge request may be presented to the payer for review. When reviewing the charge request, the payer may be prompted to approve or reject the charge request. The payer may elect to wait a period of time before approving or rejecting the charge request. The methods may include transmitting a notification to the payer informing the payer of pending expiration of the period of time.

If the payer does not take any further action after expiration of the period of time, the methods may include applying a default decision to the charge request. The default decision may be one of a plurality of default decisions. Each default decision may be associated with one or more attributes. One of the default decisions may be applied to a request if the request includes one or more attributes associated with the default decision.

For example, the payer may instruct a treasury management system that if the payer does not take any further action after expiration of the time period, and the request is for an amount above a threshold amount, the request should be rejected.

Apparatus may include a computer system. The computer system may include a non-transitory computer readable medium having computer readable program code embodied therein. The computer system may include a processor configured to execute the computer readable program code. The computer readable program code in the computer system when executed by the processor configures the computer system to perform one or more tasks.

The computer may be configured to receive a bill-pay authorization submitted by a payer. The bill-pay authorization may be submitted by the payer to a vendor. The computer may be configured to receive a payment authorization issued by the payer. The payment authorization may be issued by the payer directly to a payee.

The computer may be configured to receive a debit request to withdraw funds from a financial account of the payer. The debit request may be submitted by a payee. The debit request may correspond to a check deposited by the payee. The debit request may correspond to a request to charge a credit card of the payer.

The computer may be configured to reconcile the debit request with one of the bill-pay authorization or the payment authorization. If the debit request does not correspond to the bill-pay authorization or the payment authorization, the computer may be configured to mark the debit request as an exception. The computer may be configured to deny the debit request marked as an exception. The computer may be configured to display the debit request marked as an exception to the payer. The display may include prompting the payer to approve or reject the debit request.

The bill-pay authorization may be one of a plurality of bill-pay authorizations. The plurality of bill-pay authorizations may be received from a plurality of bill-pay vendors.

Each bill-pay vendor may be responsible for transmitting a payment to a payee on behalf of the payer. The payment may be a paper check, a credit card authorization or any suitable payment method or device. The bill-pay authorization may include an instruction to issue a check to a payee. The bill-pay authorization may include an instruction to charge a credit card of the payer.

Each of the bill-pay authorizations may be transmitted by one or more bill-pay vendors to a central location. The central location may be a financial institution. The financial institution may hold one or more accounts of the payer.

The payment authorization may be one of a plurality of payment authorizations. Each payment authorization may correspond to a payment remitted by the payer directly to a payee without using a bill-pay vendor. Each of the plurality of payment authorizations may be transmitted to the central location. The plurality of payment authorizations may be transmitted from different divisions, units or lines of business of the payer.

The computer system at the central location may be configured to receive a plurality of debit requests. Each debit request may correspond to a bill-pay authorization or a payment authorization. The computer system at the central location may be configured to reconcile a plurality of debit requests with the plurality of bill-pay authorizations and the plurality of payment authorizations.

The computer system at the central location may be configured to mark one of the plurality of debit requests as an exception if one of the plurality of debit requests does not correspond to at least one of the bill-pay authorizations. The computer system at the central location may be configured to mark one of the plurality of debit requests as an exception if one of the plurality of debit requests does not correspond to at least one of the payment authorizations.

Using a computer system at the central location, a payer may view the plurality of debit requests. Using the computer system at the central location, the payer may filter the plurality of debit requests. For example, the computer system may be configured to display to the payer each debit request associated with: (1) an exception and (2) a specific bill-pay vendor.

The computer system may be configured to, in response to an approval of the credit card payment, transmit a notification to the payer after the payee has received a credit corresponding to the credit card charge.

Apparatus for bill-pay integration are provided. The apparatus may include a treasury management system.

The treasury management system may include a check issuing apparatus controlled by a bill-pay vendor. The check issuing apparatus may include a first non-transitory computer readable medium. The first non-transitory computer readable medium may include first computer readable program code embodied therein. The check issuing apparatus may include a first processor. The first processor may be configured to execute the first computer readable program code.

The first computer readable program code in the check issuing apparatus when executed by the processor configures the check issuing apparatus to receive a payment instruction from a payer. In response to receipt of the payment instruction, the check issuing apparatus may be configured to issue a first check to a payee. The first check may include a set of payment attributes. Illustrative payment attributes are shown below in Table 2.

TABLE 2

Illustrative payment attributes.
Illustrative check segments

Check number
Check number
Customer name
Customer address 1
Customer address 2
Routing number
Account number
Payee segment
Payee endorsement
Payee
Date
Amount
Dollars
Comment
Comment
Signature
Logo
Bar Code The treasury management system may include an account management apparatus ("AMA"). The AMA may be controlled by a drawee bank. The drawee bank may not be affiliated with the bill-pay vendor. The AMA may include a second non-transitory computer readable medium. The second non-transitory computer readable medium may include second computer readable program code embodied therein.

The AMA may include a second processor configured to execute the second computer readable program code. The second computer readable program code in the AMA when executed by the processor may configure the AMA to perform one or more tasks.

The AMA may be configured to receive a first set of payment attributes from the bill-pay vendor. The AMA may be configured to receive a check image based on the first set of payment attributes. The AMA may insert one or more of the payment attributes into a check template. The template may be received from the bill-pay vendor or the payer. In some embodiments, the AMA may generate a check template based on checks processed on behalf of the payer.

The AMA may be configured to receive a digital image corresponding to a second check issued by the payer. The second check image may be transmitted to the drawee bank from a depositary bank. The second check image may correspond to a check deposited by a payee. The second check may include a second set of payment attributes. The second set of payment attributes may include one or more attributes shown above in Table 2.

The AMA may be configured to display a first check image to the payer. The AMA may be configured to display the image of the second check to the payer. The first check image and the second check image may be displayed to the payer substantially simultaneously. The first check image and the second check image may be displayed adjacent to each other. The payer may be prompted to decide whether to apply a check service to the first check image or the second check image.

Applying a check service may correspond to an approval or rejection of a later submitted payment request received from a payee. Applying a check service may correspond to terminating an ability of the payer to recover a payment made to a payee of the check. Applying a check service may correspond to a payer recovering a payment made to a payee of the check. The payer and payee may be included in the first check image. The payment request may correspond to a deposited check.

The AMA may be configured to assign a first identifier to the first check. The first identifier may be a member of a first set of identifiers. Each member of the first set of identifiers may correspond to a bill-pay vendor. Based on the first identifier, the payer may identify a source of the payment attributes included in a displayed first check.

The second check may include a second identifier. The second identifier may be a member of a second set of identifiers. Each member of the second set of identifiers may correspond to a payment issued by the payer. The payment issued by the payer may have been issued without utilizing a bill-pay vendor.

None of the second set of identifiers may be a member of the first set of identifiers. The first set of identifiers may uniquely identify a first source of payment attributes. The second set of identifiers may uniquely identify a second source of payment attributes.

The set of payment attributes may be a first set of payment attributes. The AMA may be configured to generate an affirmation file. The affirmation file may include one or more entries. The AMA may generate the affirmation file based on one or more sets of payment attributes. The affirmation file may include a first set of payment attributes received from a bill-pay vendor. The affirmation file may include a second set of payment attributes extracted from a digital image of a second check. Each entry in the affirmation file may include one set of payment attributes.

The AMA may be configured to present the affirmation file to the payer. The payer may review the affirmation file. A drawee bank may be instructed not to allow a withdrawal of funds from an account of the payer unless the payer approves of an entry in the affirmation file. After the payer approves an entry in the affirmation file, the drawee bank may be authorized to withdrawn funds corresponding to the approved entry. The AMA may be configured to amalgamate payment attributes from a plurality of sources into a single affirmation file. Each source may be associated with a unique identifier or set of identifiers. A viewer of the affirmation file may distinguish between sources of information in the affirmation file based on the unique identifier of each source.

The AMA may scrub the affirmation file. Scrubbing the affirmation file may detect one or more anomalous entries included in the affirmation file. The AMA may be configured to present the anomalous entries to the payer for approval or rejection.

A set of payment attributes may be one of a plurality of sets of payment attributes. The AMA may be configured to receive each set of payment attributes from the bill-pay vendor. The AMA may be configured to assign a member of the first set of identifiers to each set of payment attributes.

The first payment information may include information corresponding to a plurality of first payments received from a bill-pay vendor. Each of the plurality of first payment may be issued by the bill-pay vendor on behalf of the payer. The AMA may be configured to receive a payment request based on a first check transmitted to a payee by the bill-pay vendor. The payment request may correspond to a check deposited by the payee. The AMA may be configured to determine if the payment request corresponds to one of the plurality of first payments received from the bill-pay vendor.

If the payment request corresponds to one of the first payments received from the bill-pay vendor, the AMA may be configured to debit an account of the payer an amount included in the payment request. If the payment request does not correspond to one of the plurality of first payments received from the bill-pay vendor, the AMA may be configured to classify the payment request as an exception. An exception may correspond to an anomalous entry in the affirmation file.

A digital image may be a first digital image. A payment request may include a second digital image. The second digital image may be generated after a payee deposits a check. The second digital image may correspond to a check deposited by the payee. The AMA may be configured to associate the exception with a member of the first set of identifiers. The member of the first set of identifiers may indicate to a viewer a source of the exception.

Based on the first identifier, the AMA may be configured to display, to the payer, the second digital image corresponding to the exception. The AMA may be configured to prompt the payer to review the exception based on the second digital image. In response to receiving a confirmation from the payer, the AMA may be configured to debit the account of the payer the amount included in the exception. The confirmation may correspond to an overriding of a default status associated with the exception. The default status may be a check service such as the check services shown above in Table 1.

The first identifier may be a sequence of numbers, digits, colors or a logo corresponding to a source of payment attributes. The source may be a bill-pay vendor.

A treasury management system may include a mobile device. The AMA may be configured to receive an entitlement associated with the mobile device. The entitlement may be received from a payer. The mobile device may be associated with an employee of the payer. Based on the entitlement, the AMA may be configured to filter an affirmation file. In response to a request from the mobile device, the AMA may be configured to display the filtered affirmation file. A user of the mobile device may approve or reject only contents of the filtered affirmation file.

The affirmation file may be filtered based on any suitable payment attribute. Illustrative payment attributes are shown above in Table 2.

For example, the payer may wish to limit approve/reject decisions made from mobile devices to payment amounts less than a threshold amount. A small screen of the mobile device may increase a risk of an erroneous decision being made using the mobile device. The AMA may filter the affirmation file based on a payment amount of each entry in the affirmation file.

The AMA may be configured to transmit a notification to the bill-pay vendor. The notification may be transmitted in response to a rejection of the first check image. A rejection of the first check image may correspond to placing a stop payment on a check corresponding to the first check image.

Apparatus for bill-pay integration are provided. Apparatus may include a check issuing device. The check issuing device may be operated by a bill-pay vendor. The check issuing device may include a first computer system configured to receive a payment instruction from a payer. The first computer system may be configured to generate payment information based on the payment instruction.

The check issuing device may include a check printer. The check printer may be configured to print a paper check in response to the payment instruction.

The apparatus may include a central management device ("CMD"). The CMD may be operated by a drawee bank. The CMD may include a second computer system. The second computer system may be configured to receive the payment information from the check issuing device. The second computer system may be configured to assign an identifier to the payment information received from the check issuing device.

The CMD may be configured to generate a first check image. The first check image may be generated based on the payment information received from the check issuing device. The CMD may integrate the payment information into a check template. The check template may be familiar to the payer.

The payment information may include any suitable payment attribute. Illustrative attributes are shown above in Table 2. Based on the payment information, the first check image may include a payee, an identifier, an amount and a financial account of the payer. The financial account of the payer may be held at the drawee bank. The account of the payer may be managed by the drawee bank.

The CMD may be configured to present the first check image to the payer. In response to receiving a confirmation from the payer, the CMD may authorize a transfer of the amount from the account of the payer to the payee.

An identifier assigned to a first check may be a first number. The first number may be a member of a first set of numbers. The first set of numbers may not include a second number. The second number may be a member of a second set of numbers. None of the second set of numbers may be used to identify a check printed by the check issuing apparatus.

The CMD may be configured to calculate interest owed to the payer on the amount. The CMD may calculate interest as accruing to the payer until the amount is transferred to the payee. Interest may accrue to the payer after the drawee bank transfers the amount to a holding account during a check clearing process.

The drawee bank may not withdraw funds corresponding to the amount from the account of the payer until completion of a check clearing process associated with the check corresponding to the first check image.

The CMD may be configured to generate a reconciliation file. The reconciliation file may include first payment information received from the check issuing apparatus. The CMD may receive a digital image corresponding to a paper check generated by the check issuing apparatus.

The CMD may be configured to extract second payment information from a second image. The second image may correspond to a check generated by the payer or any entity other than the bill-pay vendor operating the check issuing apparatus.

The CMD may compare the first payment information to the second payment information. The CMD may flag the digital image as an exception if the first payment information does not correspond to the second payment information.

A treasury management system may include a mobile device. The CMD may be further configured to receive an entitlement. The entitlement may correspond to access privileges to the treasury management system. The entitlement may be associated with the mobile device. In response to a request for a display of the reconciliation file from the mobile device, the CMD may filter the reconciliation file based on the entitlement.

The treasury system may include a network of mobile devices. Each mobile device on the network may be associated with one of a plurality of entitlements. Each of the plurality of entitlements may correspond to a set of access privileges to the treasury management system.

Each mobile device on the network may be associated with at least one of the plurality of entitlements. Each entitlement may correspond to a restriction on access to the treasury management system. Each mobile device may be restricted in accessing the treasury management system based on the entitlement associated with the mobile device.

Methods for electronically coordinating a flow of payments from a payer to a plurality of payees are provided. The methods may involve one or more non-transitory computer-readable media storing computer-executable instructions. The computer-executable instructions, when executed by a processor may perform a method for electronically coordinating a flow of payments from a payer to a plurality of payees. The processor and instructions may be controlled by a computer system of a drawee bank.

The method may include receiving a payment instruction issued by a payer. The payer may issue the payment instruction to a bill-pay vendor. In response to receiving the payment instruction, the bill-pay vendor may generate a paper check on behalf of the payer. The paper check may be transmitted to a payee. The bill-pay vendor may transmit the payment instruction to the computer system of the drawee bank.

The methods may include generating a digital image. The generating may include marking the digital image. The marking may correspond to the bill-pay vendor.

The digital image may be one of a plurality of digital images presented to the payer. The plurality of digital images may include digital images generated based on payment instructions issued by the payer to a plurality of bill-pay vendors. Marking the digital image may include assigning an identifier to the digital image. The identifier may correspond to the bill-pay vendor that issued a paper check based on the payment instruction received from the payer.

The methods may include presenting the digital image to the payer. The digital image may be presented to the payer before an amount indicated on the check is transferred to a payee. The digital image may be presented to the payer after an amount indicated on the check is transferred to a payee.

In response to a confirmation of the payment instruction by the payer, the methods may include removing a restriction preventing a payment of the check. The payer may confirm the payment instruction based on payment information presented to the payer. The methods may include releasing funds to a payee, i.e., paying the check, in response to receiving a confirmation from the payer.

A payment amount of a check may be accessible to the payer until the payment amount is transferred to the payee. The payment amount may remain in an account of the payer until completion of a check clearing process associated with a deposit, by the payee of the check. The payer may continue to earn interest on the payment amount until the payment amount is released to the payee. The payment amount may not be released to the payer until completion of the check clearing process.

Illustrative embodiments of apparatus and methods in accordance with the principles of the invention will now be described with reference to the accompanying drawings, which form a part hereof. It is to be understood that other embodiments may be utilized and that structural, functional and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

FIG. 1 is a block diagram that illustrates a computing device 101 (alternatively referred to herein as a "server or computer") that may be used according to an illustrative embodiment of the invention. The computer server 101 may have a processor 103 for controlling overall operation of the server and its associated components, including RAM 105, ROM 107, input/output ("I/O") module 109, and memory 115.

I/O module 109 may include a microphone, keypad, touch screen and/or stylus through which a user of device 101 may provide input, and may also include one or more of a speaker for providing audio output and a video display device for providing textual, audiovisual and/or graphical output. Software may be stored within memory 115 and/or other storage (not shown) to provide instructions to processor 103 for enabling server 101 to perform various functions. For example, memory 115 may store software used by server 101, such as an operating system 117, application programs 119, and an associated database 111. Alternatively, some or all of computer executable instructions of server 101 may be embodied in hardware or firmware (not shown).

Server 101 may operate in a networked environment supporting connections to one or more remote computers, such as terminals 141 and 151. Terminals 141 and 151 may be personal computers or servers that include many or all of the elements described above relative to server 101. The network connections depicted in FIG. 1 include a local area network (LAN) 125 and a wide area network (WAN) 129, but may also include other networks. When used in a LAN networking environment, computer 101 is connected to LAN 125 through a network interface or adapter 113. When used in a WAN networking environment, server 101 may include a modem 127 or other means for establishing communications over WAN 129, such as Internet 131.

It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program 119, which may be used by server 101, may include computer executable instructions for invoking user functionality related to communication, such as email, short message service (SMS), and voice input and speech recognition applications.

Computing device 101 and/or terminals 141 or 151 may also be mobile terminals including various other components, such as a battery, speaker, and antennas (not shown). Terminal 151 and/or terminal 141 may be portable devices such as a laptop, tablet, smartphone or any other suitable device for receiving, storing, transmitting and/or displaying relevant information.

Any information described above in connection with database 111, and any other suitable information, may be stored in memory 115. One or more of applications 119 may include one or more algorithms that may be used to receive payment instructions, calculate interest, generate digital images, present digital images, assign identifiers to digital images and/or any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
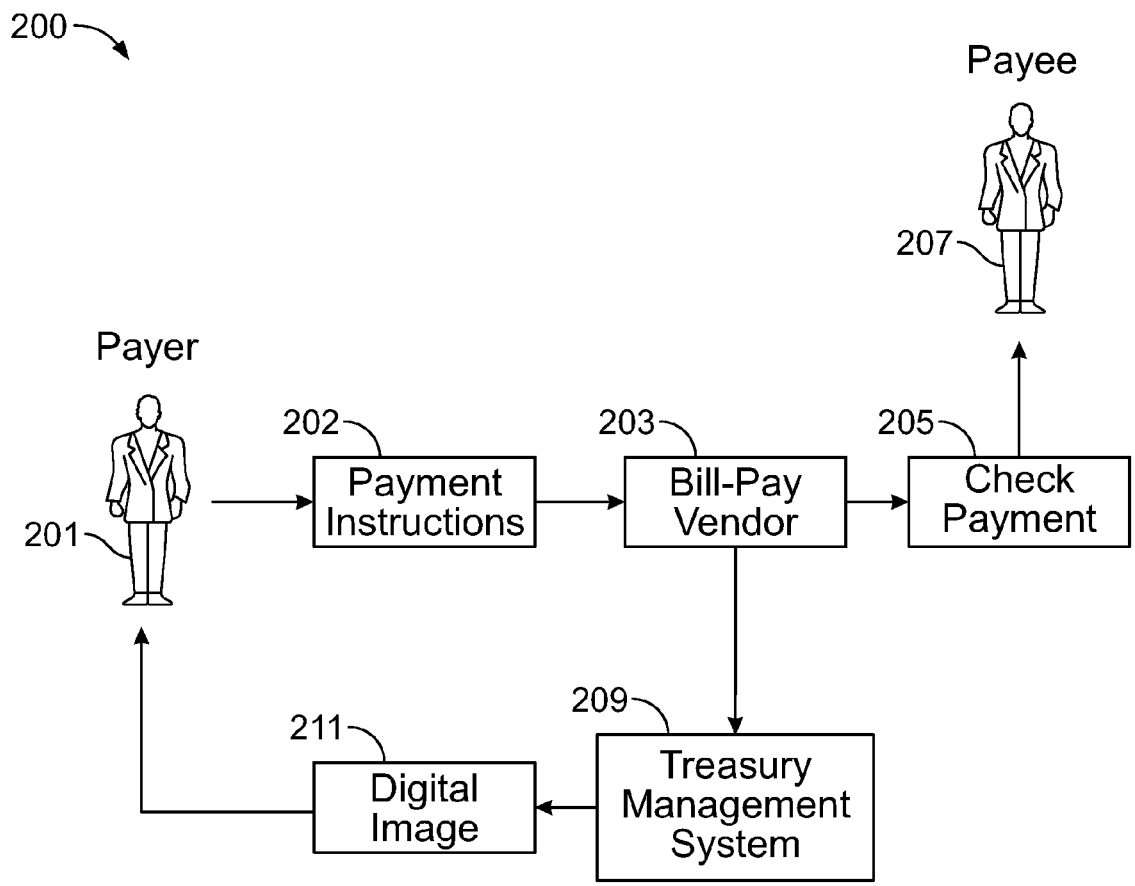
FIG. 2 shows an illustrative arrangement in accordance with principles of the invention.

FIG. 2 shows illustrative arrangement 200. Arrangement 200 includes payer 201. Payer 201 may issue payment instructions 202 to bill-pay vendor 203. Bill-pay vendor 203 may issue payment 205 to payee 207. Payment 205 may include a paper check. Payment 205 may include a credit card authorization. Payment 205 may include any suitable payment method or device.

Bill-pay vendor 203 may transmit payment instructions 202 to treasury management system 209. Treasury management system 209 may generate digital image 211 based on payment instructions 202. Treasury management system 209 may present digital image 211 to payer 201. Treasury management system 209 may present digital image 211 and check services that may be applied to payment 205. For example, payer 201 may affirm payment 205 when viewing digital image 211.

Figure 3:
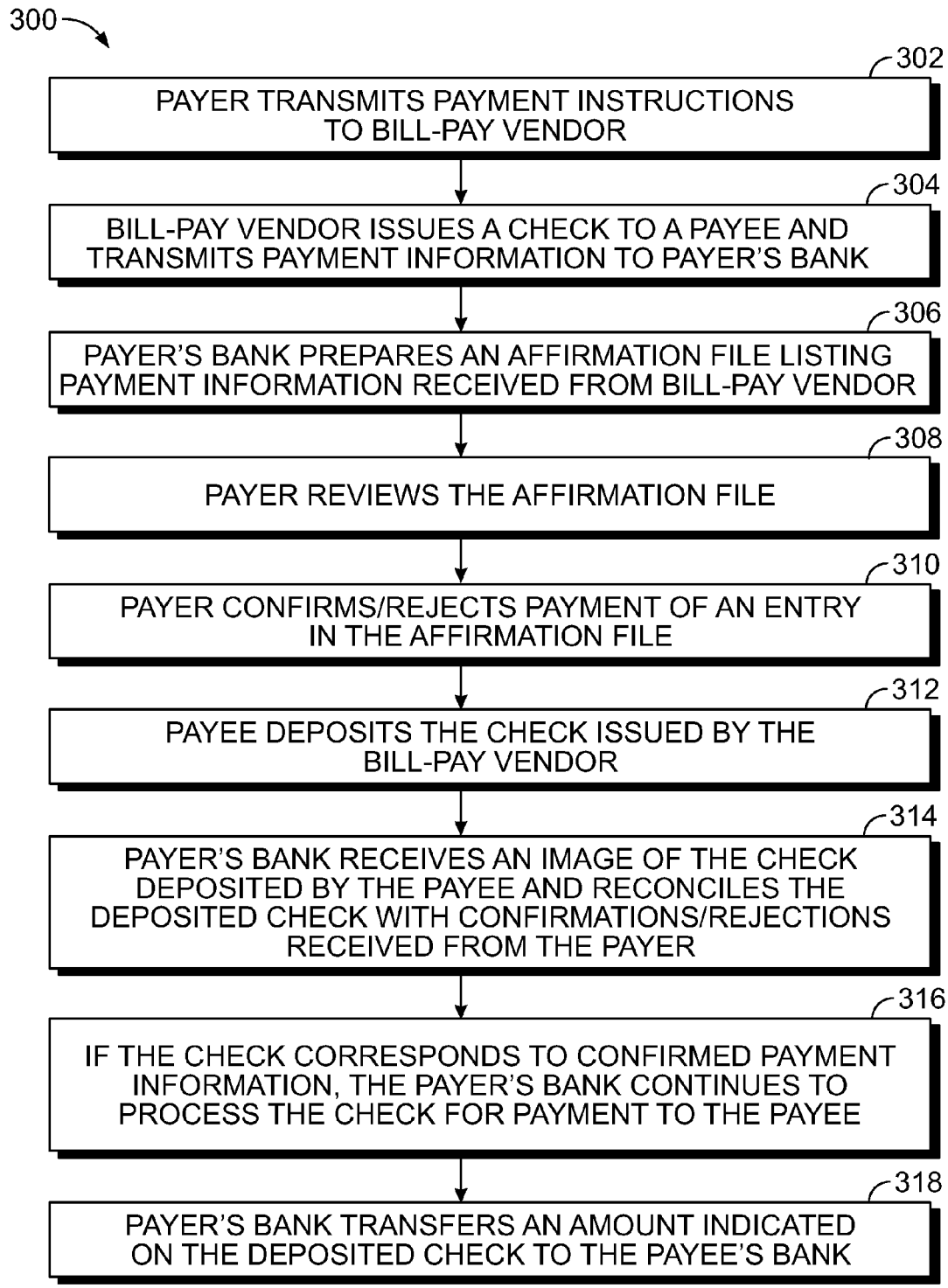
FIG. 3 shows an illustrative process in accordance with principles of the invention.

FIG. 3 shows illustrative process 300. For the sake of illustration, one or more of the steps of the process illustrated in FIG. 3 will be described as being performed by a "system." The "system" may include one or more of the features of the apparatus or arrangement shown in FIGS. 1-2 and/or any other suitable device or approach. The "system" may be provided by an entity. The entity may be an individual, an organization or any other suitable entity.

At step 302, a payer transmits payment instructions to a bill-pay vendor. At step 304, the bill-pay vendor issues a check to a payee and transmits payment information to payer's bank. The payer's bank may be a drawee bank indicated on the check. At step 306, the payer's bank prepares an affirmation file. The affirmation file lists payment information received by the payer's bank from the bill-pay vendor.

At step 308, the payer reviews a displayed version of the affirmation file.

At step 310, the payer confirms or rejects the affirmation file, or selected contents thereof. At step 312, the payee deposits the check issued by the bill-pay vendor. At step 314, the payer's bank receives an image of the check deposited by the payee and reconciles the deposited check with confirmations/rejections received from the payer.

If the payer, at step 310, confirms the first check image, when the payee deposits the check, payment of the check may be fulfilled. If the payer, at step 310, rejects the check, when the payee deposits the check issued by the bill-pay vendor, payment of the check may be denied.

At step 316, the payer's bank continues to process the check for payment to the payee if the check corresponds to confirmed payment information. At step 318, funds may be withdrawn from an account of the payer and credited to an account of the payee. If the payer does not confirm the first check, funds will not be withdrawn from the account of the payer in response to the deposit of the payee.

Figure 4:
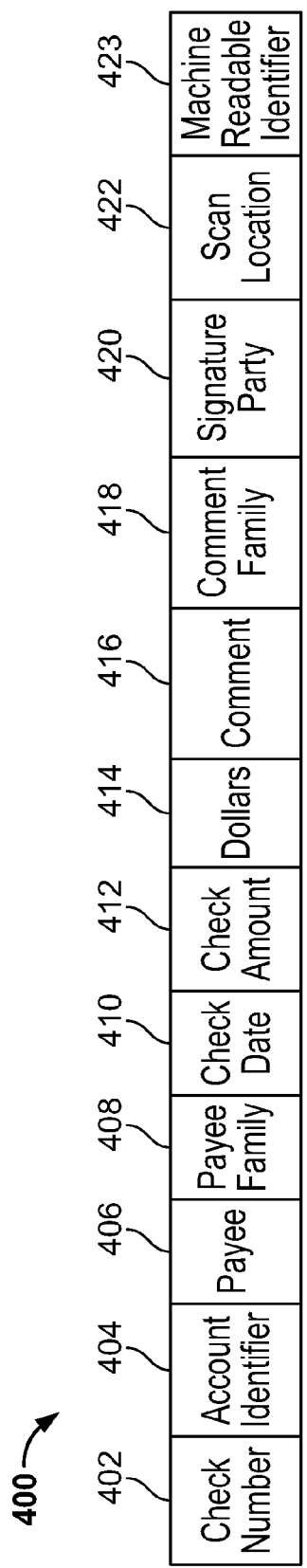
FIG. 4 shows illustrative information in accordance with principles of the invention.

FIG. 4 shows illustrative file entry 400. File entry 400 may a ledger entry. File entry 400 may correspond to a payment instruction issued by a payer. File entry 400 may correspond to information received from a bill-pay vendor. File entry 400 may include one or more fields such as check number 402, account identifier 404, payee 406, payee family 408, check date 410, check amount 412, dollars 414, comment 416, comment family 418, signature 420, scan location 422 and machine readable identifier 423. Machine readable identifier 423 may include bar coded information.

Each of the fields may correspond to a segment of a check. A bill-pay vendor may issue a paper check to a payee that includes each of the fields. The paper check may include one or more segment identifiers that correspond to the field. For example, the segment identifiers may include "DATE," "PAY TO THE ORDER OF," "DOLLARS," "MEMO" and any other suitable identifiers. Based on file entry 400, a drawee bank may generate a first check image for display to a payer.

Figure 5:
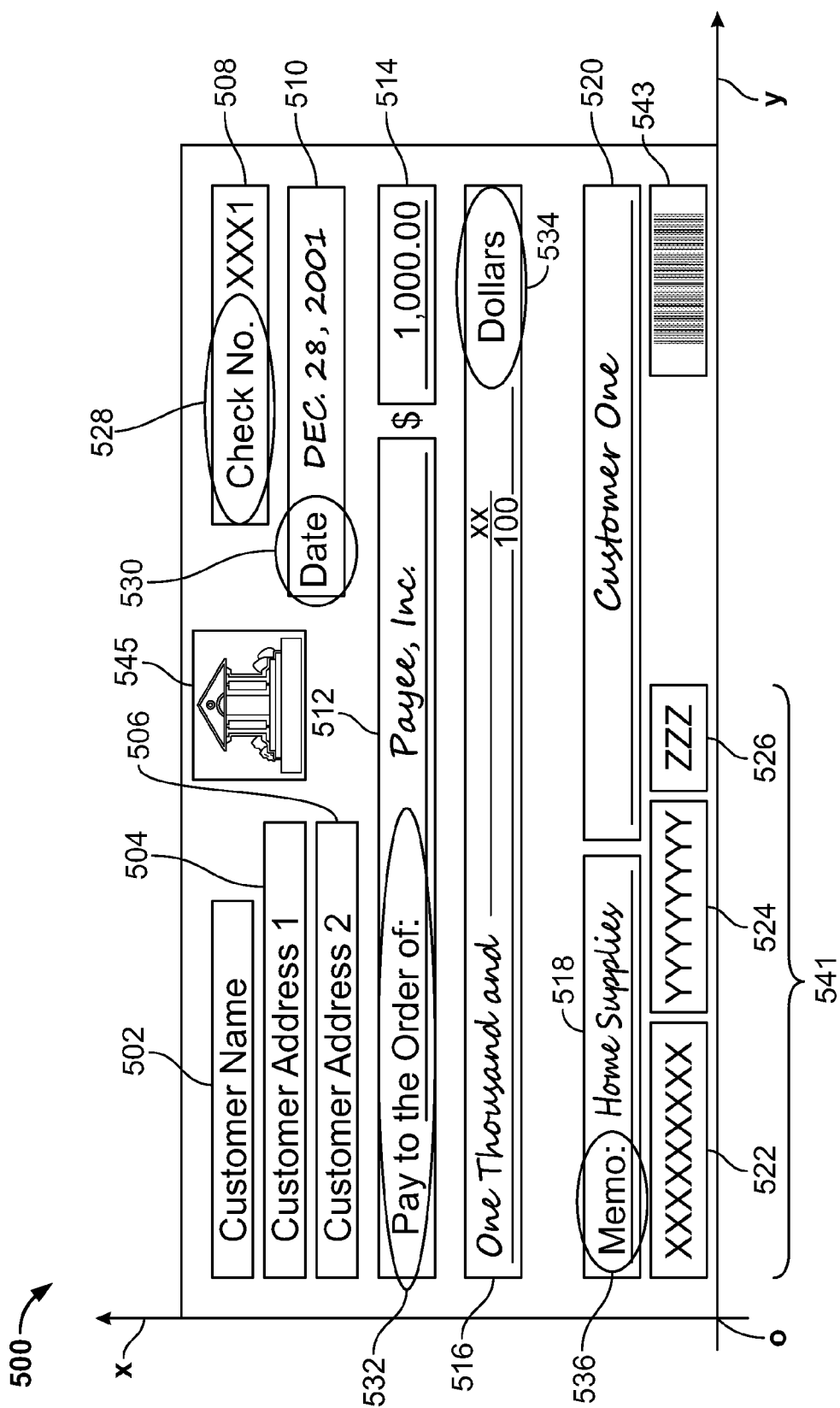
FIG. 5 shows an illustrative image in accordance with principles of the invention.

FIG. 5 shows illustrative first check image 500. Image 500 may be first check image generated by on payment information received from a bill-pay vendor. Digital image 500 may be a template based on a paper check issued by a bill-pay vendor.

Image 500 may include one or more segments. Each of the one or more segments may be filled-in by a computer system. Each segment of image 500 may correspond to information that may be included on the front of a paper check. In FIG. 5, a segment may be identified by one or more rectangular boxes. For example, image 500 may include one or more of payer name segment 502, payer address 1 segment 504, payer address 2 segment 506, check number segment 508, date segment 510, payee segment 512, amount segment 514, dollars segment 516, comment segment 518, payer signature segment 520, routing number segment 522, account number field 524, check number field 526 and any other suitable segments.

Image 500 may include one or more segment identifiers. Each segment identifier may correspond to a type of information that is displayed on the check to identify a check segment. For example, check image 500 may include one or more of "check number" segment identifier 528, "date" segment identifier 530, "pay-to-the-order-of" segment identifier 532, "dollars" segment identifier 534, "memo" field identifier 536 and any other suitable segment identifiers.

The generating of first check image 500 may include extracting information from a file. The extracted information may be inserted into an appropriate segment of an image 500.

An illustrative method for inserting information into image 500 may include identifying an origin "O" of the image 500. Origin O may be identified as a location on check image 500 from which to quantify the relative locations of the segments. For example, origin O may be coincident with the lower left corner of a check upon which check image 500 is based. Axis "x" may run along an edge of the check. For example, axis x may run along the lower edge of the check. Axis "y" may be orthogonal to axis x and may run along an edge of the check. For example, axis y may run along the side edge of the check. Locations of each of the segments may be quantified by coordinates based on the x- and y-axes.

For example, the location of a rectangular segment may be quantified as the coordinates of four corners of a rectangle. Any other suitable scheme for quantifying segment locations may be used.

Generating image 500 may include generating text data. The text data may be generated based on information extracted from payment information or instructions received from a payer and/or bill-pay vendor.

For example, the text data may include a numerical identifier of the check. The numerical identifier may be the check number. The numerical identifier may include segment 508. The text data may include the amount. The amount may correspond to numbers handwritten by the payer in field 514. The amount may correspond to words handwritten by the payer within segment 516.

The text data may include a drawee bank name. The drawee bank may be identified based on segment 545. Segment 545 may be a logo associated with a drawee bank. Segment 545 may include text associated with a drawee bank. Segment 545 may include address or name information associated with a drawee bank.

The text data may include an account number on the check. The account number may correspond to a MICR data 541 printed on a check. Segment 541 may include a routing number 522. Segment 541 may include an account number 524.

Figure 6:
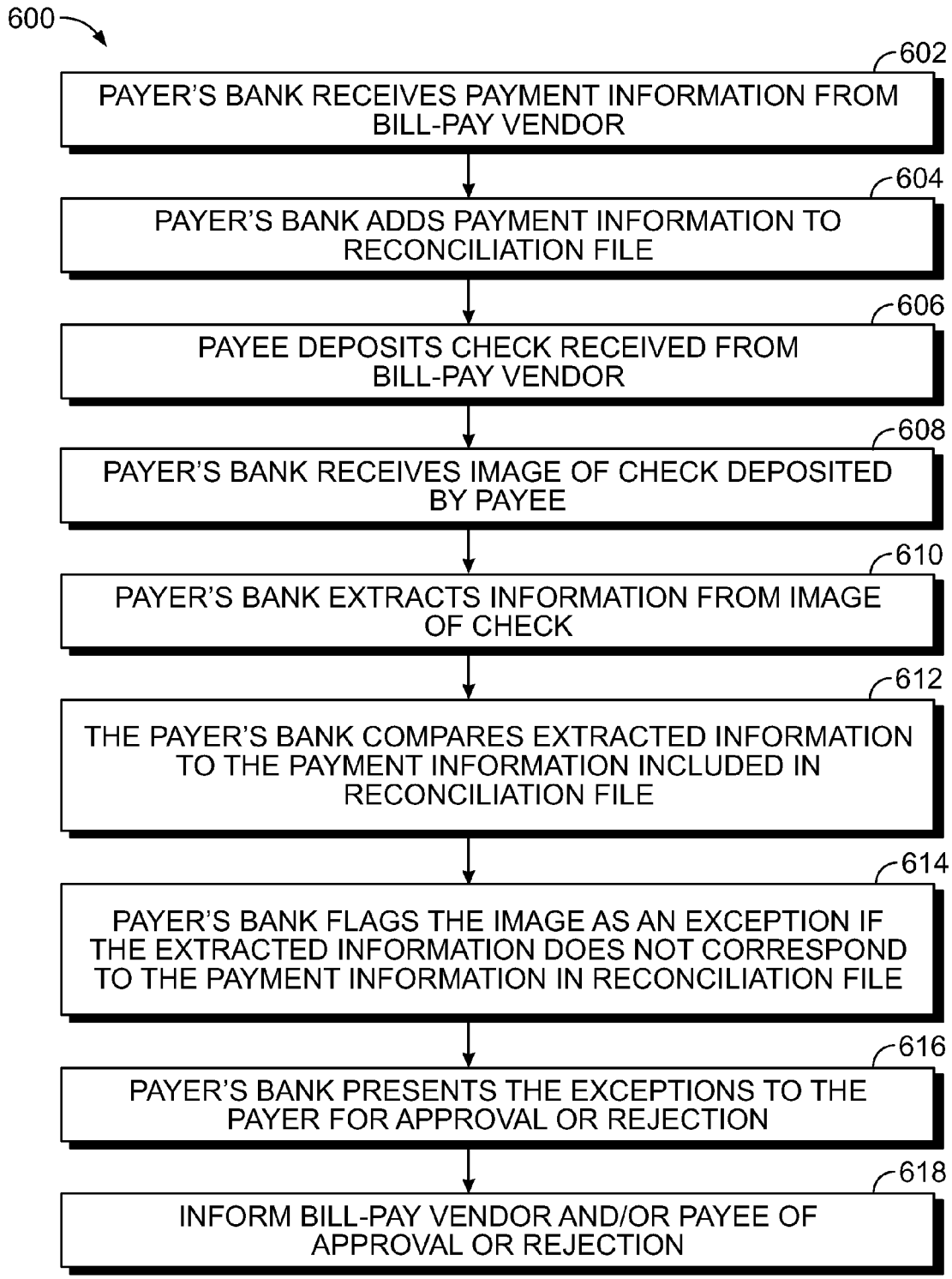
FIG. 6 shows an illustrative process in accordance with principles of the invention.

FIG. 6 shows illustrative process 600. For the sake of illustration, one or more of the steps of the process illustrated in FIG. 6 will be described as being performed by a "system." The "system" may include one or more of the features of the apparatus, arrangements or processes shown in FIGS. 1-5 and/or any other suitable device or approach. The "system" may be provided by an entity. The entity may be an individual, an organization or any other suitable entity.

At step 602, a payer's bank receives payment information from a bill-pay vendor. The payment information may correspond to a payment transmitted by the bill-pay vendor to a payee. The payment may include a paper check. At step 604, the payer's bank adds the payment information to a reconciliation file.

At step 606, the payee deposits a check received from the bill-pay vendor. At step 608, the payer's bank receives image of check deposited by the payee. The image may include one or more features of image 500 (shown in FIG. 5).

At step 610, the payer's bank extracts information from an image of the check, such as image 500 (shown in FIG. 5). An illustrative method for extracting information from the digital image may include identifying an origin "O" of image 500. Origin O may be identified as a location on check image 500 from which to quantify the relative locations of the segments. For example, origin O may be coincident with the lower left corner of a check upon which check image 500 is based. Axis "x" may run along an edge of the check. For example, axis x may run along the lower edge of the check. Axis "y" may be orthogonal to axis x and may run along an edge of the check. For example, axis y may run along the side edge of the check. Locations of each of the segments may be quantified by coordinates based on the x- and y-axes.

For example, the location of a rectangular segment may be quantified as the coordinates of four corners of a rectangle. Any other suitable scheme for quantifying segment locations may be used.

Extracting the information from the digital image may include deciphering a handwritten segment of the check. Deciphering the handwritten segment may include converting a signature from a handwritten entry into text. The converting may be performed by a processor. The processor may be further configured to run an application that translates content of a segment from handwriting to estimated block text. The application may be any suitable application.

For example, the application may be an application such as that available under the trademark PARASCRIPT® from Parascript, LLC, Longmont, Colo. The application may preprocess the segment content by applying one or more mathematical filters to the segment content. The filter may include, for example, tools for line-detection, edge detection, curve detection, shape detection, contrast adjustment, feature density (such as the amount of "ink" pixels per unit area of field or per unit length of a horizontal or vertical axis of the field), feature density distribution (such as the amount of "ink" pixels per unit area as a function of location in the field), topological quantification (such as the number, size, distribution and perimeter per unit area of closed forms in the content) and any other suitable tools.

The extracting may include deciphering information printed on the check. For example, the text data may include a numerical identifier of the check. The numerical identifier may be the check number. The numerical identifier may include segment 508 (shown in FIG. 5). The text data may include the amount. The amount may correspond to numbers handwritten by the payer in field 514 (shown in FIG. 5). The amount may correspond to words handwritten by the payer within segment 516 (shown in FIG. 5).

At step the 612, the payer's bank compares the extracted information to the payment information included in reconciliation file. At step 614, the payer's bank flags the image as an exception if the extracted information does not correspond to the payment information in the reconciliation file. If the extracted information does not correspond to the payment information in the reconciliation file, the deposited check may be an unauthorized or fraudulent check.

At step 616, the payer's bank presents the exceptions to the payer for approval or rejection. At step 618, the system informs the bill-pay vendor and/or the payee of an approval or rejection by the payer. After being informed of a rejection, the payee may contact the payer to contest the rejection.

Figure 7:
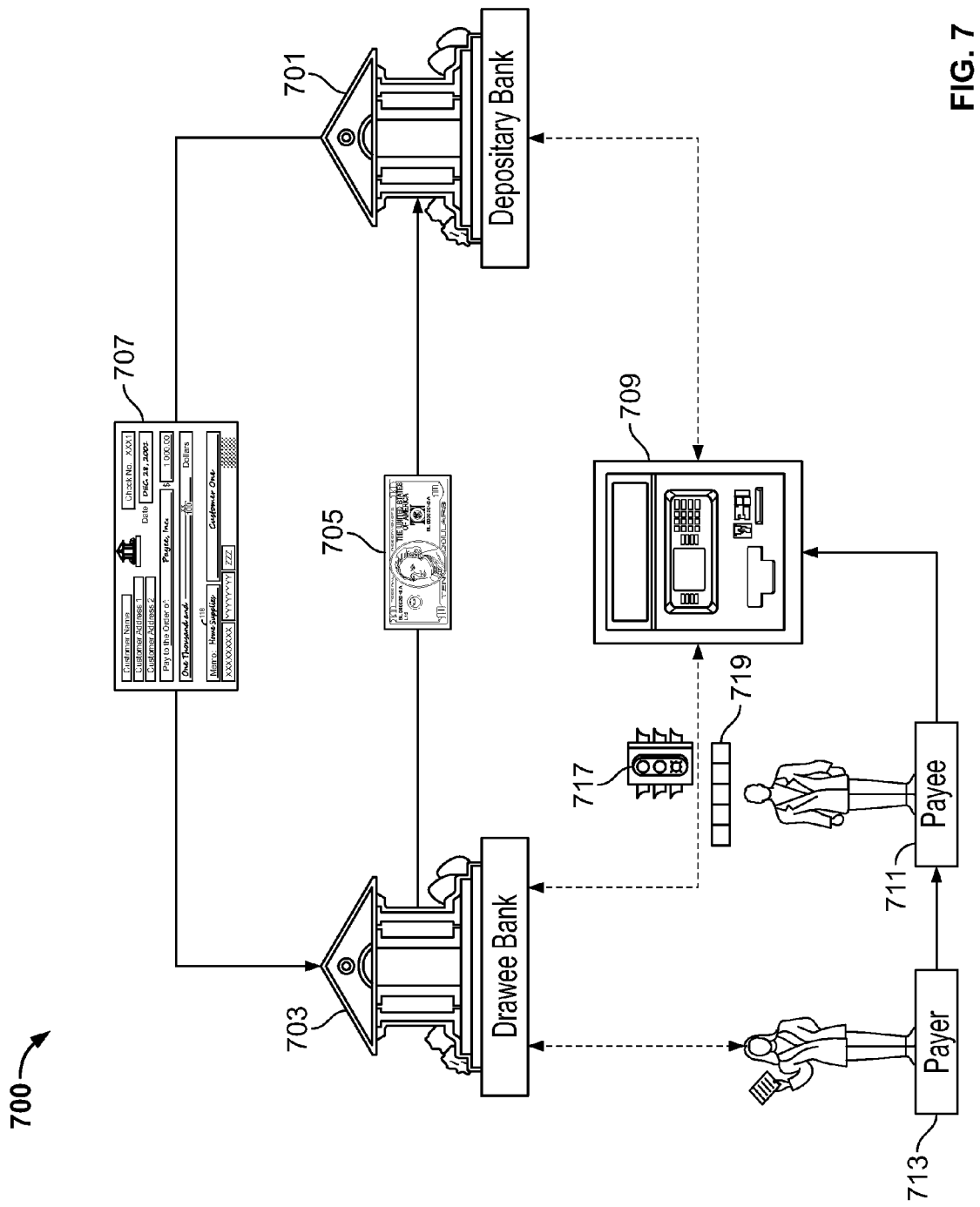
FIG. 7 shows an illustrative process in accordance with principles of the invention.

FIG. 7 shows illustrative clearing process 700. A check deposited by a payee may be subject to clearing process 700. For the sake of illustration, one or more of the steps of the process illustrated in FIG. 7 will be described as being performed by a "system." The "system" may include one or more of the features of the apparatus, arrangements or processes shown in FIGS. 1-6 and/or any other suitable device or approach. The "system" may be provided by an entity. The entity may be an individual, an organization or any other suitable entity.

Process 700 may include participants such as a payer 713, drawee bank 703, payee 711 and depositary bank 701.

Payer 713 may issue a check to payee 711. The check may include an order issued by payer 713. The order may direct drawee bank 703 to pay an amount, the amount indicated on the check, to payee 711. The check may be a paper check.

Payee 711 may deposit the check. The payee may deposit the check at self-service kiosk 709. The self-service kiosk may be an ATM. Payee 711 may request that depositary bank 701 credit an account of the payee based on the deposit of the check. Self-service kiosk 709 may be associated with drawee bank 703. Self-service kiosk 709 may be associated with depositary bank 701. Self-service kiosk 709 may be associated with a financial institution that is neither drawee bank 703 nor depositary bank 701.

Self-service kiosk 709 may be configured to generate digital image 707 of the check. Self-service kiosk 709 may be configured to generate a transaction record 719. Transaction record 719 may include one or more features of file entry 400 (shown in FIG. 4). Transaction record 719 may be generated based on information extracted from digital image 707. Digital image 707 and transaction record 719 may be generated by self-service kiosk 709 or depositary bank 701.

Transaction record 719 may be transmitted to drawee bank 703. Self-service kiosk 709 may transmit image 707 to drawee bank 703. Drawee bank 703 may be identified based on MICR data on the check. Drawee bank 703 may be identified based on any suitable information extracted from digital image 707.

Drawee bank 703 may conduct a fraud detection analysis based on transaction record 719. The fraud analysis may include comparing one or more fields of transaction record 719 to financial information known or accessible to drawee bank 703. The financial information known or accessible to drawee bank 703 may include one or more fields of a ledger entry maintained by drawee bank 703. The ledger entry may include one or more features of file entry 400 (shown in FIG. 4).

Drawee bank 703 may transmit fraud indicator 717 to payer 713. Fraud indicator 717 may be transmitted to depositary bank 701 or payee 711. Fraud indicator 717 may be transmitted to payee 711 before payee 711 ends the session at self-service kiosk 709.

Based on fraud indicator 717, drawee bank 703 may transfer funds 705 to depositary bank 701. The amount of funds 705 may correspond to an amount extracted from digital image 707.

Depositary bank 701 may transmit digital image 707 to drawee bank 703. Drawee bank 703 may securely store digital image 707. Drawee bank 703 may securely store transaction record 719.

Figure 8:
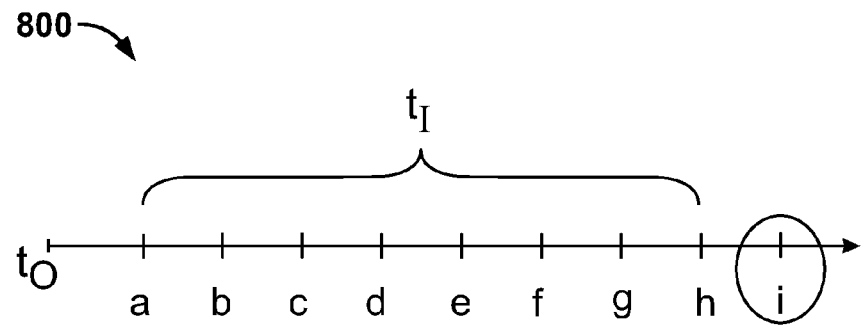
FIG. 8 shows illustrative information in accordance with principles of the invention.

FIG. 8 shows illustrative time-line 800. Time-line 800 includes times a-i. Times a-i may correspond to steps 302-318 (shown in FIG. 3). Times a-i may correspond to steps in a check clearing process such as process 700 (shown in FIG. 7).

During times a-h interest may accrue on funds held in an account of the payer. The interest may accrue after a payee has deposited a check against the account of the payer. The interest may continue to accrue until time i. Time i may represent a completion of a check clearing process. At time i, funds corresponding to an amount indicated on the check may be withdrawn from the account of the payer. At time i, the funds corresponding to the amount indicated on the check may be transferred to an account of the payee.

During times a-h, funds corresponding to an amount indicated on the check may be transferred from an account of the payer to a holding account controlled by the drawee bank. During times a-h interest may accrue on the amount in the holding account. The interest that accrues while the amount is in the holding account may be credited to the payer. At time i, the funds corresponding to the amount indicated on the check may be transferred to an account of the payee.

In some embodiments, funds corresponding to the amount indicated on the check deposited by the payee may remain available to the payer until time i. At time i, at a conclusion of a check clearing process, funds corresponding to the amount indicated on the check deposited by the payee may be withdrawn from the account of the payer and/or transferred to the payee. A drawee bank may allow a payer to reap benefits of a "float time" $T_f$ associated with a check clearing process.

Figure 9:
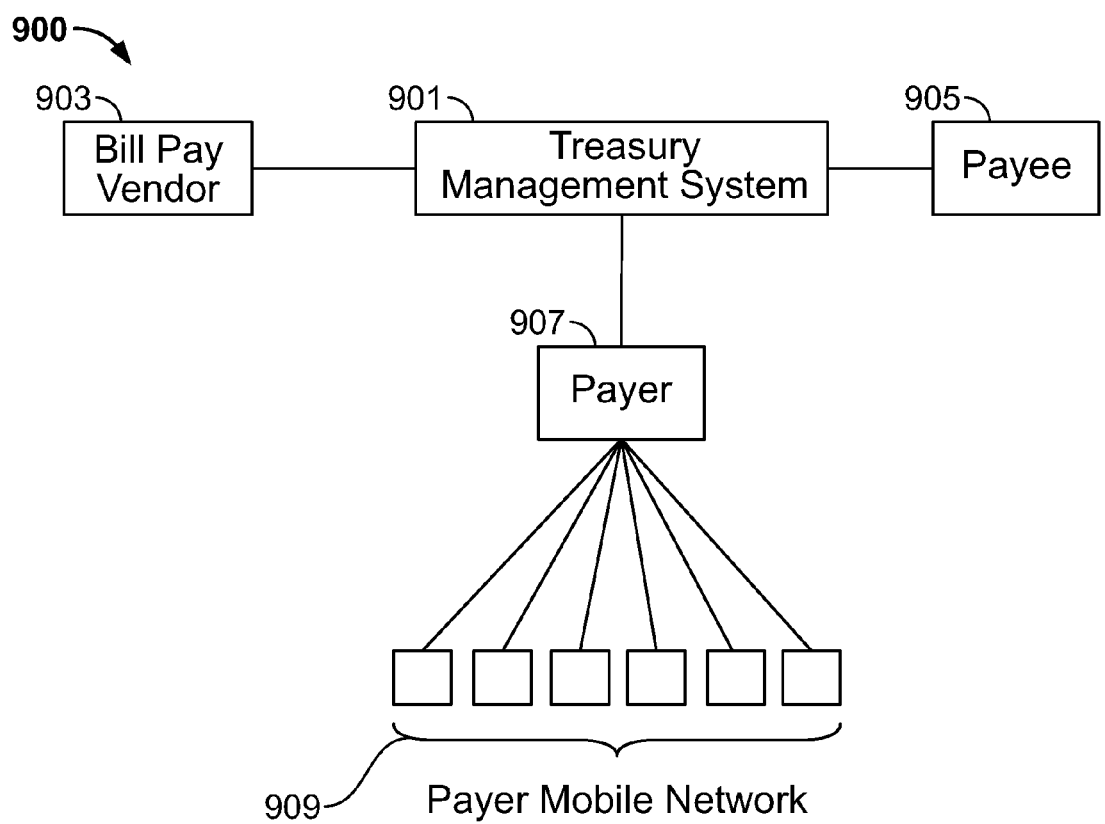
FIG. 9 shows an illustrative arrangement in accordance with principles of the invention.

FIG. 9 shows illustrative arrangement 900. Arrangement 900 includes treasury management system 901. Treasury management system 901 may include one or more features of treasury management system 209 (shown in FIG. 2).

Treasury management system 901 may be linked to a bill-pay vendor 903. The link may be an electronic communication link. Bill-pay vendor 903 may electronically transmit payment information received from payer 907 to treasury management system 901. Treasury management system 901 may present payment information received from bill-pay vendor 903 to payer 907. Treasury management system 907 may present the payment information received from bill-pay vendor 903 as a first check. Payer 907 may confirm or reject the payment information presented by treasury management system 901.

Treasury management system 901 may receive payment information from payee 905. For example, payee 905 may deposit a check signed by payer 907. Treasury management system 901 may receive notification that payee 907 has deposited the check. The notification may include a digital image of the deposited check.

Treasury management system 901 may reconcile payment information received from bill-pay vendor 903 with information extracted from the check deposited by payee 905. Treasury management system 901 may present a reconciliation file and/or a result of a reconciliation to a payer 907.

Payer 907 may access treasury management system 901 using network 909. Network 909 may include a plurality of mobile devices. Each mobile device may include one or more features of server 101, terminal 141 or terminal 151 (shown in FIG. 1). Each mobile device may be in possession of an employee of payer 907. Each mobile device may be associated with an entitlement. The entitlement may restrict access to treasury management system 901. For example, using a mobile device on network 909, some employees may only be able to view payment information received from bill-pay vendor 903. Other employees may be able to transmit a confirm or reject decision over network 909. Over network 909, some employees may view a result of a reconciliation process performed by treasury management system 901.

FIG. 10A shows illustrative view 1001. View 1001 is shown on mobile device 1005. Mobile device 1005 may access treasury management system 901 via network 909 (shown in FIG. 9). Treasury management system 901 may generate affirmation file 1007. Affirmation file 1007 may be generated based on payment information 400 (shown in FIG. 4). Affirmation file 1007 may be viewed on mobile device 1005. Payment information 400 may be received from a bill-pay vendor such as bill-pay vendor 203 (shown in FIG. 2) or bill-pay vendor 903 (shown in FIG. 9).

Affirmation file 1007 includes columns 1008, 1009, 1011, 1013, 1015, 1017 and 1019. Affirmation file 1007 includes rows 1021, 1023, 1025 and 1027. Each row in affirmation file 1007 may correspond to an entry included in the affirmation file 1007.

One or more of columns 1008, 1009, 1011, 1013, 1015, 1017 and 1019 may displayed to a user (not shown) of mobile device 1005 based on an entitlement associated with the user or an entitlement associated with mobile device 1005. One or more of rows 1021, 1023, 1025 and 1027 may displayed to a user (not shown) of mobile device 1005 based on an entitlement associated with the user or an entitlement associated with mobile device 1005.

Column 1008 shows an action associated with each row in affirmation file 1007. For each row, a viewer of affirmation file 1007 may elect to affirm or rejection the payment indicated in that row of affirmation file 1007. For example, column 1008 shows that the payment in row 1021 has been affirmed by a viewer. Based on the affirmation of the viewer, if a check or other payment method is deposited or requested by a payee, a treasury management system may initiate a transfer of funds from a payer to the payee. Illustrative treasury management systems may include treasury management system 209 (shown in FIG. 2) and treasury management system 901 (shown in FIG. 9).

Column 1009 shows an identifier associated with each row in affirmation file 1007. The identifier may be assigned to a row based on a source of the payment information included in the row. For example, the identifier associated with row 1021 is "BP333." "BP" may indicate to a viewer that the payment information included in row 1021 originated from a bill-pay vendor. Column 1011 shows a date associated with each row in the affirmation file. Column 1013 shows a payee associated with each row. The payment information may correspond to a payment requested by a payer to be made to the payee. For example, row 1021 may correspond to a payment made by a bill-pay vendor to payee XYZ Corp. on behalf of a payer.

Column 1015 shows an amount associated with each row in affirmation file 1007. Column 1017 shows a currency associated with the amount shown in column 1015. For example, columns 1015 and 1017 show that a payer requested that a bill-pay vendor transmit a payment of 120,000.00 U.S. dollars. Column 1019 shows an account associated with each row in affirmation file 1007. Each row may be associated with an account designated by a payer for payment to the payee shown in column 1013, amount shown in column 1015, currency shown in column 1017 or any other suitable criteria.

FIG. 10B shows illustrative view 1003. View 1003 includes reconciliation file 1029 shown on mobile device 1005. Reconciliation file includes columns 1031, 1033, 1035, 1037, 1038, 1039, 1041 and 1043. Reconciliation file includes rows 1045, 1047, 1049, 1051 and 1053.

One or more of columns 1031, 1033, 1035, 1037, 1038, 1039, 1041 and 1043 may displayed to a viewer (not shown) using mobile device 1005 based on an entitlement associated with the user or an entitlement associated with mobile device 1005. One or more of rows 1045, 1047, 1049, 1051 and 1053 may displayed to a user (not shown) of mobile device 1005 based on an entitlement associated with the user or an entitlement associated with mobile device 1005.

A treasury management system may generate reconciliation file 1029 based on information extracted from a plurality of digital images and from affirmation file 1007 (shown in FIG. 10A). Reconciliation file 1029 may be generated based on correlating each row in affirmation file 1007 to information extracted from a plurality of digital images. The plurality of digital images may correspond to paper checks cashed by a plurality of payees. Each digital image may include one or more features of image 500 (shown in FIG. 5). Column 1031 of reconciliation file 1029 may present a digital image corresponding to payment information in a row of reconciliation file 1029.

For example, row 1053 does not include an affirm/reject indicator in column 1033. Row 1053 may be an exception. A viewer of reconciliation file 1029 may access the image presented in column 1031 to review the image corresponding to row 1053.

If the information extracted from a digital image corresponds to a row (entry) in affirmation file 1007 (shown in FIG. 10A), a treasury management system may determine an action to be performed. The action may be determined based on a selection indicated in column 1008 of the affirmation file. If the information extracted from the digital image does not correspond to an entry in affirmation file 1007, payment information extracted from the image may be flagged as an exception. Exceptions may be presented to a payer for further review.

Figure 11C:
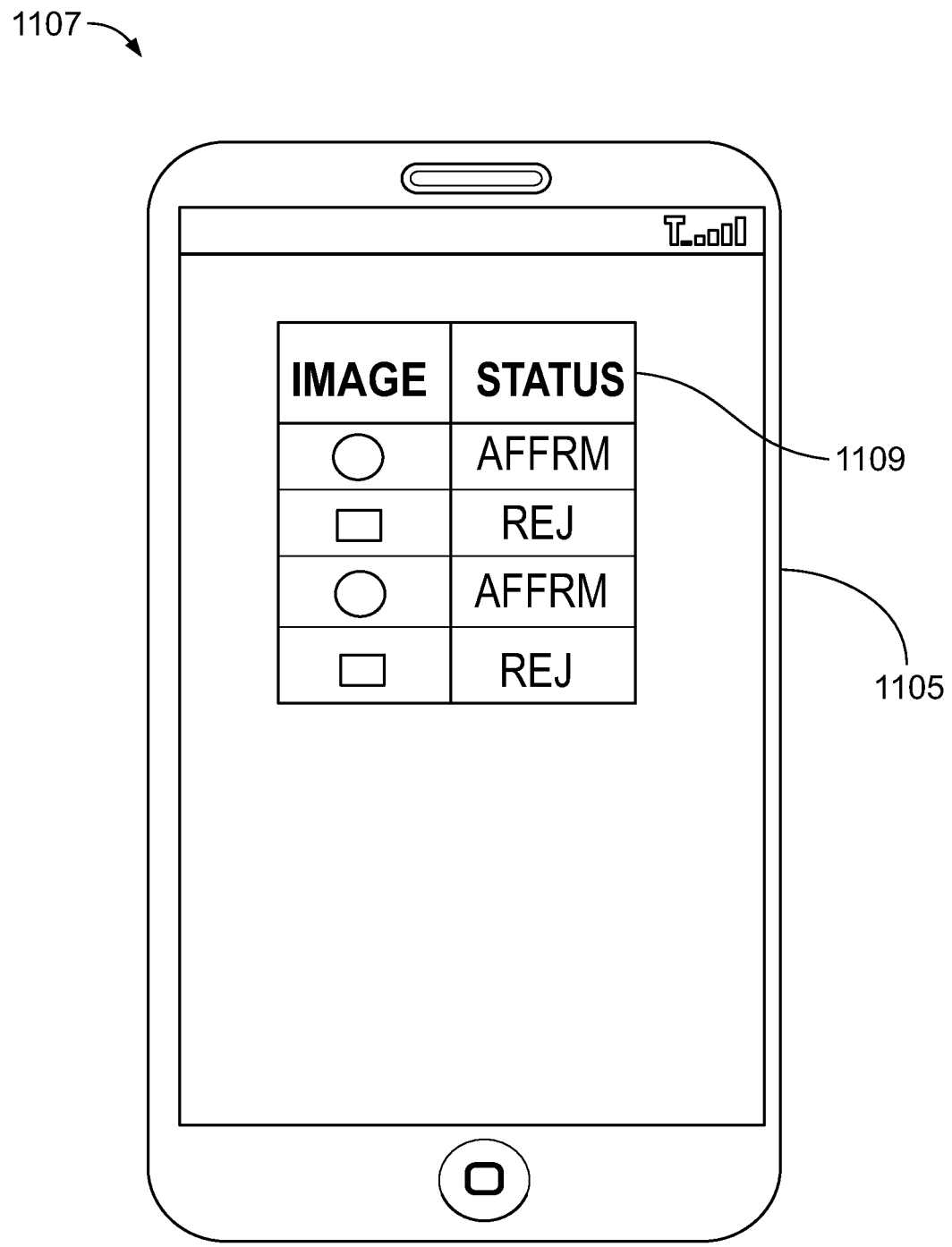

FIGS. 11A, 11B and 11C show illustrative views 1101, 1103 and 1107. Views 1101 and 1103 show illustrative entitlements applied when accessing a treasury management system via mobile device 1105.

View 1101 shows filtered version 1102 of affirmation table 1007 (shown in FIG. 10A). In filtered version 1102, column 1008 is inaccessible to a user of mobile device 1005. View 1101 shows that the user of mobile device 1105 may be unable to elect to affirm or reject payment information on behalf of a payer.

View 1103 shows filtered version 1104 of affirmation file 1007 (shown in FIG. 10A). In filtered version 1104, column 1008 and rows 1025 and 1027 affirmation file 1007 are inaccessible to a user of mobile device 1105. View 1103 shows that the user of mobile device 1105 may be unable to elect to affirm or reject payment information on behalf of a payer. View 1103 shows that the user of mobile device 1105 may be only able to view payment information associated with a bill-pay vendor "BP."

View 1107 shows filtered version 1109 of reconciliation table 1029 (shown in FIG. 10B). In filtered version 1109, columns 1035-1043 of reconciliation file 1029 are inaccessible to a user of mobile device 1005. View 1107 shows that the user of mobile device 1105 may be able to view images associated with an affirmation or rejection of a payment.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, systems and methods for bill-pay integration have been provided. Persons skilled in the art will appreciate that the present invention can be practiced by other than the described embodiments, which are presented for purposes of illustration rather than of limitation. The present invention is limited only by the claims that follow.

What is claimed is:

1. A central management apparatus ("CMA") controlled by a drawee bank, the CMA comprising:
   a non-transitory computer readable medium having computer readable program code embodied therein; and
   a processor configured to execute the computer readable program code wherein the computer readable program code when executed by the processor configures the CMA to:
   receive, by the drawee bank, first payment information from a bill-pay vendor, the first payment information:
   displayed on a first check issued by the bill-pay vendor to a first payee on behalf of a payer; and
   comprising a first identifier assigned to the first check by the bill-pay vendor;
   receive second payment information displayed on a second check issued directly by the payer to a second payee, the second payment information comprising a second identifier assigned to the second check by the drawee bank;
   assign to the first payment information a third identifier that visually identifies the first payment information as being sourced from the bill-pay vendor and not from the drawee bank;
   generate a file comprising:
   the first payment information;
   the third identifier assigned to the first payment information; and
   the second payment information;
   receive a request to view the file on a mobile device;

filter the second payment information out of the file based on an entitlement associated with the mobile device, creating a filtered file;

display the filtered file to the payer on the mobile device;

receive a confirmation of the first payment information from the payer after the first check has been issued to the first payee by the bill-pay vendor, based on the displayed filtered file;

debit an account of the payer held at the drawee bank in response to the confirmation of the first payment information;

generate a first image of the first check based on the first payment information;

generate a second image of the second check based on the second payment information; and display the first image and the second image to the payer;

wherein:
  the third identifier is a member of a set of identifiers, the set of identifiers corresponding to the bill-pay vendor;
  the set of identifiers does not include the first identifier or the second identifier;
  the bill-pay vendor is unaffiliated with the drawee bank; and
  the drawee bank assigns the third identifier to the first payment information.

2. The CMA of claim 1, wherein:
the first payment information comprises:
  a first payment amount; and
  the account at the drawee bank; and
the second payment information comprises:
  the second payment amount; and
  the account at the drawee bank.

3. The CMA of claim 1, wherein the computer readable program code when executed by the processor configures the CMA to:
  receive, from a payee, a request to debit the account of the payer held at the drawee bank;
  reconcile the request with the first payment information;
  if the request of the payee reconciles with the first payment information, debit the account of the payer held at the drawee bank; and
  if the request of the payee does not reconcile with the first payment information, associate the request with an exception flag.

4. The CMA of claim 3, wherein the computer readable program code when executed by the processor configures the CMA to:
  in response to detection of the exception flag, present the request to the payer; and
  in response to a rejection of the request by the payer, credit the account of the payer held at the drawee bank.

5. The CMA of claim 3, wherein, when the request is one of a plurality of requests and each of the plurality of requests are associated with the exception flag, the computer readable program code in said CMA when executed by the processor configures the CMA to:
  present each of the plurality of requests to the payer; and
  for each of the plurality of requests to:
    receive a selection of a check service; and
    apply the check service to the request.

6. The CMA of claim 5, wherein the check service is one of:
a stop payment service;
an approve payment service; or
a return payment service.

* * * * *